United States Patent Office 3,475,320
Patented Oct. 28, 1969

3,475,320
REFINING OF WAX
Jacques Emile Demeester and Raymond Helion, Courbevoie, Hauts-de-Seine, France, assignors to The British Petroleum Company Limited, London, England, a corporation of England
No Drawing. Filed Sept. 12, 1966, Ser. No. 578,489
Claims priority, application France, Sept. 20, 1965, 31,983, 31,984
Int. Cl. C01g 43/02, 23/02
U.S. Cl. 208—27          7 Claims

ABSTRACT OF THE DISCLOSURE

Wax of improved stability to ultraviolet light and direct sunlight is obtained if it is hydrofinished over a catalyst containing hydrogenating components on an activated carbon support. A preferred embodiment uses two catalysts in series, the first having an oxide support (e.g. alumina) and the second an activated carbon support. Inferior results are obtained if the order is reversed. Preferred hydrogenating components are Ni-Mo or Ni-Co-Mo and the processing conditions may be 250–360° C., 40–106 kg./cm.$^2$, 0.1–4 v./v./hr. and at least 20 vols. H$_2$/vol. of wax.

---

The present invention relates to the hydrogenation of waxes, particularly waxes obtained from petroleum.

The term wax is used here to describe both waxes obtained from petroleum distillates (crystalline waxes) and those obtained from residues (micro-crystalline waxes). Such waxes are traditionally treated with sulphuric acid and/or clay, the acid treatment being intended to remove from the wax unstable components which are responsible for its bad odour and its poor colour stability and the clay treatment being intended to neutralise and decolorise the wax. Another traditional process for refining waxes is percolation over a solid adsorbent, such as bauxite.

While these treatments produce waxes of acceptable quality they have disadvantages, in that the yield of product is reduced and in that large quantities of spent acid and clay have to be disposed of. Because of this refiners are now turning to a mild hydrocatalytic process, generaly known as hydrofinishing, in which the unstable components of the wax are selectively converted at elevated temperature and pressure in the presence of hydrogen and a hydrogenation catalyst. Hydrofinishing gives products of good odour and odour stability, but not all hydrofinishing processes give products which are colour stable when exposed to ultraviolet light or direct sunlight (which contains ultraviolet light).

It has now been found that waxes of improved stability to ultraviolet light can be obtained if the support for the hydrogenation catalyst is correctly chosen. It has also been found that particularly good results are obtained if two catalysts having different types of support are used in series.

According to the present invention a process for the refining of waxes to give products of good stability to ultraviolet light comprise passing the wax in admixture with at least 20 volumes of hydrogen/volume of wax at elevated pressure and a temperature of from 250 to 360° C. over a catalyst consisting of one or more hydrogenating metals on an activated carbon support.

The invention also includes a process for the refining of waxes to give products of good stability to ultraviolet light comprising passing the wax in admixture with at least 20 volumes of hydrogen/vol. of wax at elevated pressure and a temperature of from 250 to 360° C. over a catalyst consisting of one or more hydrogenating metals on a refractory inorganic oxide support and then over a catalyst consisting of one or more hydrogenating metals on an activated carbon support.

The hydrogenating metals are preferably chosen from the known hydrogenating metals of Group VI or VIII of the Periodic Table, or rhenium. The metals, particularly the Group VI metals, the iron group metals or rhenium may be used in the form of their oxides or sulphides. The amounts of each metal may be within the following ranges.

Group VI metals _____ 3–25% wt. calculated as the oxide MoO$_3$, Cr$_2$O$_3$ or W$_2$O$_7$.
Nickel or cobalt _____ 1–15% wt., calculated as NiO or CoO.
Iron _____ 3–25% wt., calculated as Fe$_2$O$_3$.
Platinum group metals ___ 0.1–5% wt., calculated as the metal.
Rhenium _____ 1.25% wt., calculated as ReO$_7$.

Preferred hydrogenating components are a group VI metal oxide or sulphide together with one or more iron group metal oxides or sulphides. Particularly preferred hydrogenating components are from 3 to 20 %wt. of molybdenum oxide and 1 to 10% wt. of either nickel oxide or nickel and cobalt oxides. For example, the catalyst may have 9 to 15% wt. of MoO$_3$ and 3 to 5% wt. of NiO. In the two stage process, the same hydrogenating metals are preferably used for each catalyst.

Any suitable activated carbon may be used, with a preference for those having a surface area of at least 1000 m.$^2$/g. A particularly suitable activated carbon is one prepared from pine wood having the following characteristics.

Surface area _____ m.$^2$/g__  1200
Porosity _____ cc./g__   0.60
Bulk density _____ g./cc__   0.42
Particle size diameter _____ mm__    2–4

When a refractory inorganic oxide support is used in the two stage process, it is preferably the oxide of an element from Groups II to V of the Periodic Table, for example silica or, preferably, alumina. The alumina is preferably calcined before the addition of the hydrogenating components at a temperature of from 500 to 900° C., preferably 700 to 900° C.

The preferred process conditions are:

Temperature _____ ° C__  300–350
Hydrogen treating rate _____ v./v__   20–80
Pressure _____ kg./cm.$^2$__  40–106
Feedstock space velocity _____ v./v./hr__   0.1–4

Preferably the feedstock is in the liquid phase and flows downwardly over the catalyst which is in the form of a fixed bed. In the two stage process, the process conditions are preferably the same in each stage.

It is not essential to use pure hydrogen, hence a hydrogen-rich gas produced as a by-product of catalytic reforming may be used. Where impure hydrogen is used the preferred pressures specified are the hydrogen partial pressures.

The preferred feedstocks are crystalline waxes, and they preferably have an oil content of less than 1.5% wt.

In the two stage process it is important to carry out the process in the order state, viz. first with the refractory oxide supported catalyst and then with the activated carbon supported catalyst. Inferior results are obtained if the order is reversed. It is also necessary to have the hydrogenating component on the activated carbon i.e.

the proces does not merely involve the adsorption of colour-unstable bodies by the activated carbon, but also the conversion of these colour-unstable bodies by the hydrogenating component.

The product besides having an improved colour stability to ultraviolet light, also has acceptable qualities in the other necessary respects such as odour, odour stability, penetration, melting point and suitability for chlorination. Improved colour stability to ultraviolet light in the present specification preferably means that a wax product with any initial colour of at least +25 Saybolt retains a colour or more than +20 after 20 hours exposure to ultraviolet light. The exposure to ultraviolet light is carried out by placing glass bottles containing the wax in a circular cabinet having a central 125 watt U.V. lamp. The bottles are placed 22 cm. away from the lamp and after 10 hours the bottles are turned through 180°.

The activated carbon supported catalyst may be regenerated, if desired, by purging with steam at a temperature not in excess of 260° C. A similar maximum temperature may be used in the preparation of the activated carbon catalyst, the preparation of which is otherwise standard. By way of illustration a Ni-Co-Mo on active carbon catalyst may be prepared in the following manner:

(a) The activated carbon, previously dried for 12 hours at 110° C., is impregnated with a solution of ammonium molybdate. The catalyst is allowed to stand for 6 hours at ambient temperature and it is then dried for 12 hours at 110° C.

(b) The catalyst is simultaneously impregnated with solutions of nitrates of cobalt and nickel. It is allowed to stand for 6 hours at ambient temperature. It is then dried for 12 hours at 110° C.

(c) The catalyst obtained is finally heated for 4 hours. A temperature of 260° C. maximum is advisable if the catalyst is heated in air, but higher temperatures of up to 350° C. can be used if the catalyst is heated in an inert gas, such as nitrogen.

In the two stage process, the regeneration of the refractory oxide supported catalyst may follow normal practice (viz. a controlled burn off of deposits in an oxygen/inert gas or oxygen/steam mixture at, preferably, a maximum temperature of 400° C.), as may the catalyst preparation.

In the two stage process, the two catalysts may be in the same or separate reactors, preferably the latter because of the different regeneration conditions required.

In the operation of the present invention, the wax, in liquid form, is preferably treated, prior to hydrogenation, to de-aerate it and to remove traces of entrained solvent which could bring about a subsequent deterioration of the wax. A suitable form of pretreatment is, for example, steam stripping, preferably at temperature in the range 80 to 100° C.

The wax is then mixed with the necessary quantity of hydrogen, the mixture is heated to the desired reaction temperature and then passed over the catalyst at the desired rate of flow and pressure.

Gas is first of all separated from the product at the reaction pressure and the remainder of the gas is then separated in a second low-pressure separator. Finally the wax is rectified in steam and subsequently dried in vacuo.

The invention is illustrated by the following examples.

Example 1

A crystalline wax with a melting point of 51° C. was treated under the following conditions:

Temperature _____ ° C__ 340
Hydrogen pressure _____ kg./cm.$^2$__ 50
Rate of feed _____ v./v./hr__ 0.5
Rate of hydrogen _____ vol./vol__ 40

A nickel oxide on activated carbon catalyst was used and, for purposes of comparison, a nickel oxide on alumina catalyst. In both cases the composition of the catalyst was as follows:

By weight percent
Nickel oxide (NiO) _____ 15
Support _____ 85

The results obtained were as follows:

|  | NiO/Al$_2$O$_3$ catalyst | NiO/ activated carbon catalyst |
|---|---|---|
| Saybolt colour after treatment | +25 | +25 |
| After heating for 1 hr. at 200° C | +15 | +23 |
| After exposure to ultra violet light for 20 hrs | +6 | +22 |

Example 2

The same crystalline wax was treated under the same conditions as in Example 1, using a catalyst consisting of the oxides of molybdenum, cobalt and nickel on activated carbon, and, for comparison, a catalyst consisting of the oxides of molybdenum, cobalt and nickel on alumina. In the two cases the composition of the catalyst was as follows:

By weight percent
Molybdenum oxide MoO$_3$ _____ 15
Nickel oxide NiO _____ 1
Cobalt oxide CoO _____ 4
Support _____ 80

The results obtained were as follows:

|  | Mo-Co-Ni/ Al$_2$O$_3$ catalyst | Mo-Co-Ni/ activated carbon catalyst |
|---|---|---|
| Saybolt colour after treatment | +25 | +25 |
| After heating for 1 hr. at 200° C | +20 | +23 |
| After exposure to ultraviolet light for 20 hrs | +20 | +24 |

Example 3

A crystalline wax with a melting point of 50/52° C. was treated under the following conditions:

Temperature _____ C__ 340
Pressure _____ kg./cm.$^2$__ 50
Rate of feed _____ vol./vol./hr__ 0.5
Rate of hydrogen _____ vol./vol__ 40

Two catalysts were used, separately, and in combination. The composition of the catalysts and the results obtained were as follows:

| | Acid/Clay treatment | Catalyst 1 alone MoO$_3$ ___ 15% NiO ___ 5% on alumina | Catalyst 2 alone MoO$_3$ ___ 15% NiO ___ 1% CoO ___ 4% on activated carbon | Catalyst 2 then Catalyst 1 | Catalyst 1 then Catalyst 2 |
|---|---|---|---|---|---|
| Saybolt colour after treatment | +25 | +25 | +25 | +25 | +25 |
| After heating for 1 hour at 200° C | +24 | +22 | +23 | +18 | +24 |
| After exposure for 20 hrs. to ultraviolet light | +24 | +8 | +24 | +15 | +24 |
| After exposure for 8 days to sunlight | +23 | Highly Coloured | +10 | Highly Coloured | +23 |

Hydrogenation at 340° C. Pressure of hydrogen=50 kg./cm.$^2$ Specific rate of flow=0.5 vol./vol./hr. Rate of flow of hydrogen=40 vol./vol.

Example 4

Two grades of crystalline wax having melting points, respectively, of 50/52° C. and 60/62° C. were treated in a two-stage process using a Ni-Mo catalyst in each reactor.

The catalyst compositions were:

| First reactor: | Percent by weight |
|---|---|
| MoO$_3$ | 15 |
| NiO | 5 |
| Alumina | 80 |
| Second reactor: | |
| MoO$_3$ | 15 |
| NiO | 5 |
| Activated carbon | 80 |

The hydrofinishing conditions in each reactor were:

| | |
|---|---|
| Temperature | 340° C. |
| Hydrogen pressure | 50 atmospheres. |
| Rate of flow of feedstock | 0.5 vol./vol. of cat./hr. |
| Rate of flow of hydrogen | 40 vol./vol. of feedstock. |

The results obtained were:

| | Wax of 50/52° C. melting point | Wax of 60/62° C. melting point |
|---|---|---|
| Sayblot colour before ageing | +25 | +25 |
| Saybolt colur afte ageing for 1 hr. at 200° C | +23 | +25 |
| Saybolt colour after exposing to U.V. light | +22 | +23 |
| Saybolt colour after exposing for 8 days to sunlight | +22 | +24 |

We claim:

1. A process for the refining of waxes to give products of good stability to ultraviolet light comprising passing the wax in admixture with at least 20 volumes of hydrogen/vol. of wax at elevated pressure and a temperature of from 250 to 360° C. over a catalyst consisting of one or more hydrogenating metals from Group VI or Group VIII of the Periodic Table on a refractory inorganic oxide support and then over a catalyst consisting of one or more hydrogenating metals from Group VI or Group VIII of the periodic Table on an activated carbon support.

2. A process as claimed in claim 1 wherein the hydrogenating metals consist of molybdenum oxide and one or more iron group metals.

3. A process as claimed in claim 1 wherein the hydrogenating metals consist of from 3 to 20% wt., by weight of total catalyst, of molybdenum oxide and from 1 to 10% wt., by weight of total catalyst, of nickel oxide or nickel and cobalt oxides.

4. A process as claimed in claim 1 wherein the refractory inorganic oxide support is alumina.

5. A process as claimed in claim 1 wherein the process conditions are a temperature of from 300 to 350° C., a pressure of from 40 to 106 kg./cm.$^2$, a feedstock space velocity of from 0.1 to 4 v./v./hr., and a hydrogen treating rate of from 20 to 80 vol./vol. of feedstock.

6. A process as claimed in claim 1 wherein the wax is a crystalline wax.

7. A process as claimed in claim 1 wherein the max has an oil content of less than 1.5% wt.

References Cited

UNITED STATES PATENTS

| | | | |
|---|---|---|---|
| 2,846,356 | 8/1958 | Mills et al. | 208—27 |
| 3,022,245 | 2/1962 | Spars et al. | 208—27 |
| 3,052,622 | 9/1962 | Johnson et al. | 208—27 |
| 3,249,525 | 5/1966 | Stark et al. | 208—27 |

HERBERT LEVINE, Primary Examiner

U.S. Cl. X.R.

208—164

PO-1050
(5/69)

UNITED STATES PATENT OFFICE
CERTIFICATE OF CORRECTION

Patent No. 3,475,320        Dated October 28, 1969

Inventor(s) Jacques Emile Demeester and Raymond Helion

It is certified that error appears in the above-identified patent and that said Letters Patent are hereby corrected as shown below:

Column 1, line 63 "comprise" should read --comprises--;

Column 2, line 21 "1.25% wt." should read --1-25% wt.--;

Column 2, line 68 "state" should read --stated--;

Column 5, line 27 "Sayblot" should read --Saybolt--;

Column 5, line 28 "colur afte" should read --colour after--;

Column 6, Claim 7, line 1 "max" should read --wax--.

SIGNED AND
SEALED
JUN 16 1970

(SEAL)
Attest:

Edward M. Fletcher, Jr.
Attesting Officer

WILLIAM E. SCHUYLER, JR
Commissioner of Patents